US012122059B2

(12) United States Patent
Bruno et al.

(10) Patent No.: US 12,122,059 B2
(45) Date of Patent: Oct. 22, 2024

(54) INTEGRATED SPRING ELEMENT

(71) Applicant: The Gillette Company LLC, Boston, MA (US)

(72) Inventors: Michael Hal Bruno, Burlington, MA (US); Jeffrey Michael Mitrou, Windham, NH (US); Michael Sullivan, Northborough, MA (US); Matthew Michael Long, Methuen, MA (US)

(73) Assignee: The Gillette Company LLC, Boston, MA (US)

( * ) Notice: Subject to any disclaimer, the term of this patent is extended or adjusted under 35 U.S.C. 154(b) by 523 days.

(21) Appl. No.: 17/330,118

(22) Filed: May 25, 2021

(65) Prior Publication Data

US 2022/0379509 A1 Dec. 1, 2022

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01)

(58) Field of Classification Search
None
See application file for complete search history.

(56) References Cited

U.S. PATENT DOCUMENTS 4,970,784 A 11/1990 Althaus et al.
11,529,747 B1 * 12/2022 Zeng .................. B26B 21/4012
2007/0283566 A1 12/2007 Blatter et al.
2009/0193659 A1 * 8/2009 Park ..................... B26B 21/521 30/527
2012/0297625 A1 11/2012 Madden
2014/0165800 A1 6/2014 Griffin et al.
2022/0379509 A1 * 12/2022 Bruno .................. B26B 21/225

FOREIGN PATENT DOCUMENTS

WO 2008002069 A1 1/2008
WO WO 2010/037418 A1 * 4/2010
WO WO 2015/128009 A1 * 9/2015

OTHER PUBLICATIONS

PCT Search Report and Written Opinion for PCT/US2022/072366 dated Sep. 7, 2022, 13 pages.

* cited by examiner

*Primary Examiner* — Hwei-Siu C Payer
(74) *Attorney, Agent, or Firm* — Andres E. Velarde; Joanne N. Pappas

(57) ABSTRACT

Razor handles with integrated spring elements and/or methods of fabricating the same. In one example, a handle for a razor can comprise a head portion and a spring element having a distal end and a proximal end that longitudinally opposes the distal end to define an arc length of the spring element. The head portion can facilitate coupling razor cartridges in pivotal relation with the handle. The spring element can extend integrally from the head portion at the proximal end. The spring element can deflect as an abutment surface on the distal end travels in sliding engagement with a cam surface of a razor cartridge to an end point of the cam surface while exerting progressively increasing return torque as the razor cartridge rotates about a front pivot axis from a neutral position. The end point can fall proximal to a rear edge of the razor cartridge.

12 Claims, 14 Drawing Sheets

INTEGRATED SPRING ELEMENT

FIELD OF THE INVENTION

The subject disclosure relates to razors, and more specifically, to razor handles with integrated spring elements and methods of fabricating the same.

BACKGROUND OF THE INVENTION

Razors generally include one or more blades with a cutting edge that can be moved across the skin surface for shaving using a handle coupled to a razor cartridge housing the one or more blades. In some razors, a razor cartridge can be coupled in pivotal relation with a handle to facilitate rotation of the razor cartridge about a pivot axis with respect to the handle. Such rotation can improve razor performance (e.g., shave closeness and/or glide) by facilitating conformance between the skin surface and a shaving plane that corresponds to cutting edges of the one or more blades as the razor cartridge follows contours of the skin surface during shaving. In some instances, conformance between the skin surface and the shaving plane can impacted by such factors as inadequate rotation of the razor cartridge about the pivot axis and/or user dexterity.

Some razors include elements that can bias the razor cartridge towards the skin surface during shaving to mitigate the impact of such factors on conformance between the skin surface and the shaving plane. In some instances, such elements can exert variable torque on a razor cartridge as it rotates about a pivot axis. Exerting variable torque on the razor cartridge can variably bias the razor cartridge towards the skin surface during shaving. However, such variable bias can entail increased dependency on user dexterity as maintaining conformance between the skin surface and the shaving plane can involve compensating for variations in bias. In other instances, such elements can be implemented with multiple components being involved in biasing a razor cartridge towards the skin surface. For example, a razor can incorporate a component that interacts with a razor cartridge and a spring that applies a biasing force on the component to bias the razor cartridge towards the skin surface. While effective, the multiple components involved in implementing such multi-component elements can present manufacturability challenges, increase manufacturing costs, and/or introduce additional modes of mechanical failure.

SUMMARY OF THE INVENTION

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, razor handles with integrated spring elements and methods of fabricating the same are described.

According to an embodiment, a handle for a razor can comprise a head portion and a spring element. The head portion can facilitate coupling razor cartridges in pivotal relation with the handle. The spring element can have a distal end and a proximal end that longitudinally opposes the distal end to define an arc length of the spring element. The spring element can extend integrally from the head portion at the proximal end. The spring element can deflect as an abutment surface on the distal end travels in sliding engagement with a cam surface of a razor cartridge to an end point of the cam surface while exerting progressively increasing return torque as the razor cartridge rotates about a front pivot axis from a neutral position. The end point of the cam surface can fall proximal to a rear edge of the razor cartridge.

According to another embodiment, a razor can comprise a razor cartridge with a plurality of blades and a handle. The plurality of blades can be disposed in a housing that includes a front edge associated with a front pivot axis and a rear edge. The handle can include a head portion and a spring element. The head portion can facilitate coupling the razor cartridge in pivotal relation with the handle. The spring element can extend integrally from the head portion at a proximal end that longitudinally opposes a distal end of the spring element. The spring element can deflect as an abutment surface on the distal end travels in sliding engagement with a cam surface of the razor cartridge to exert progressively increasing return torque as the razor cartridge rotates about the front pivot axis such that the rear edge approaches the handle.

According to another embodiment, a handle for a razor can comprise a spring element. The spring element can have a distal end with an abutment surface and a proximal end that longitudinally opposes the distal end. The spring element can extend integrally from a head portion of the handle at the proximal end. The proximal end can comprise an arcuate surface disposed proximate to an interface between the head portion and the spring element. The arcuate surface can substantially vertically oppose the abutment surface. The abutment surface can be substantially planar with respective lower surfaces of a pair of pivot arms that extend from the head portion on laterally opposing sides of the spring element.

DETAILED DESCRIPTION OF THE INVENTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
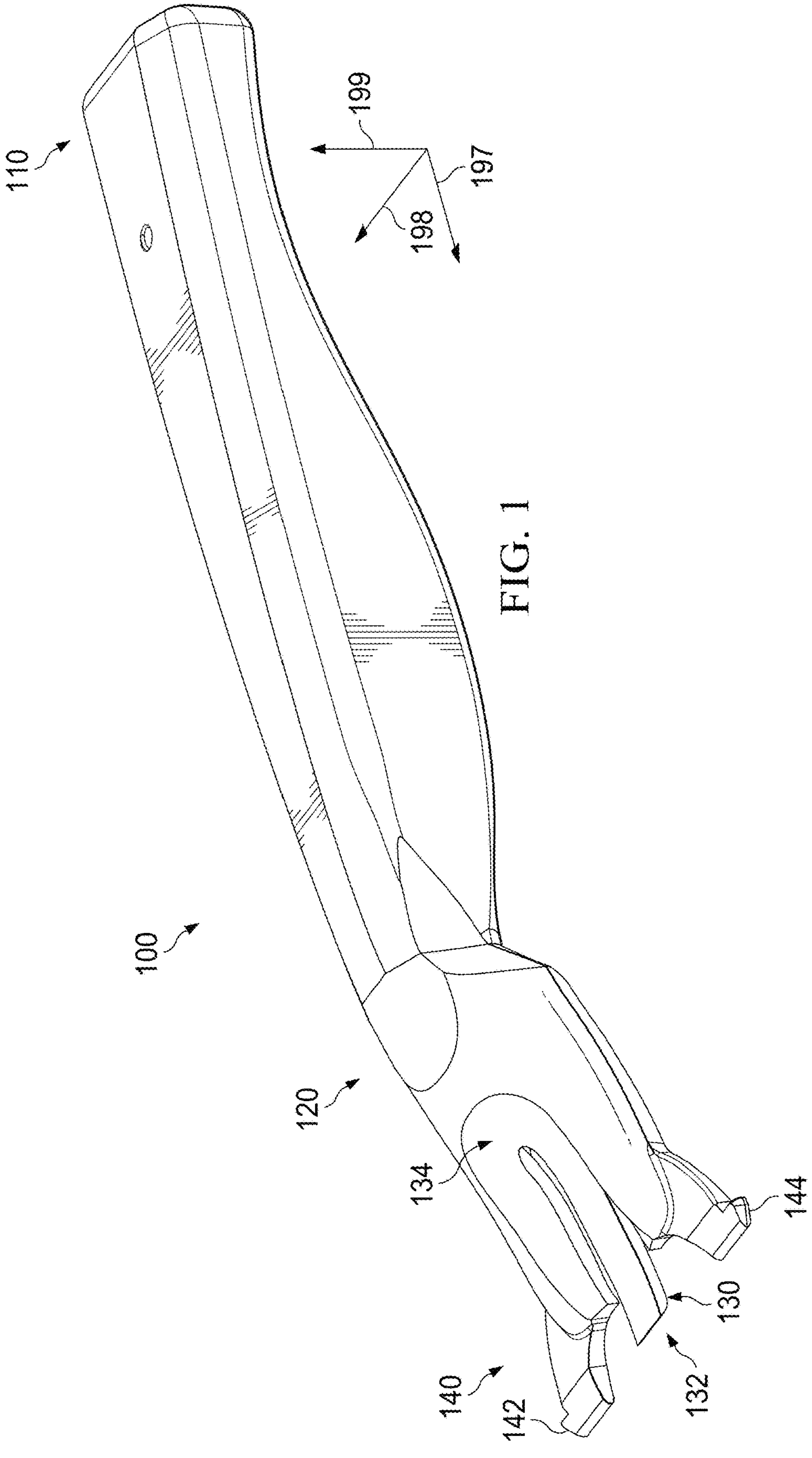
FIG. 1 illustrates an example, non-limiting isometric view depicting a handle with an integrated spring element, in accordance with one or more embodiments described herein.
Figure 2:
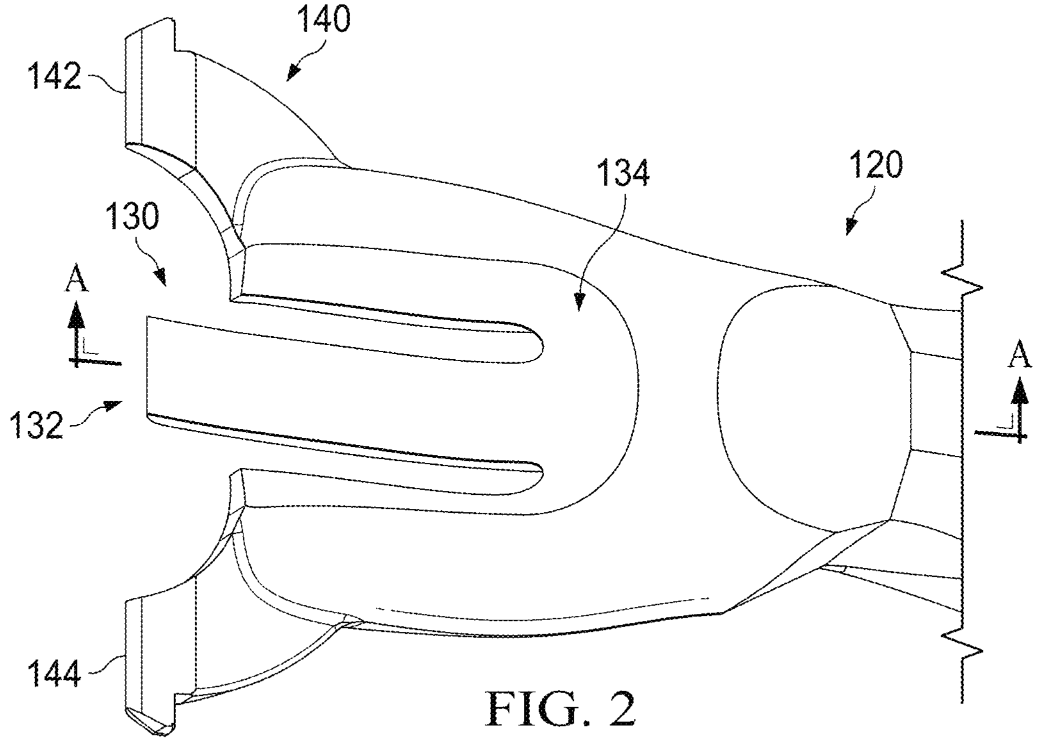
FIG. 2 illustrates an example, non-limiting isometric view depicting a head portion of the handle of FIG. 1, in accordance with one or more embodiments described herein.
Figure 3:
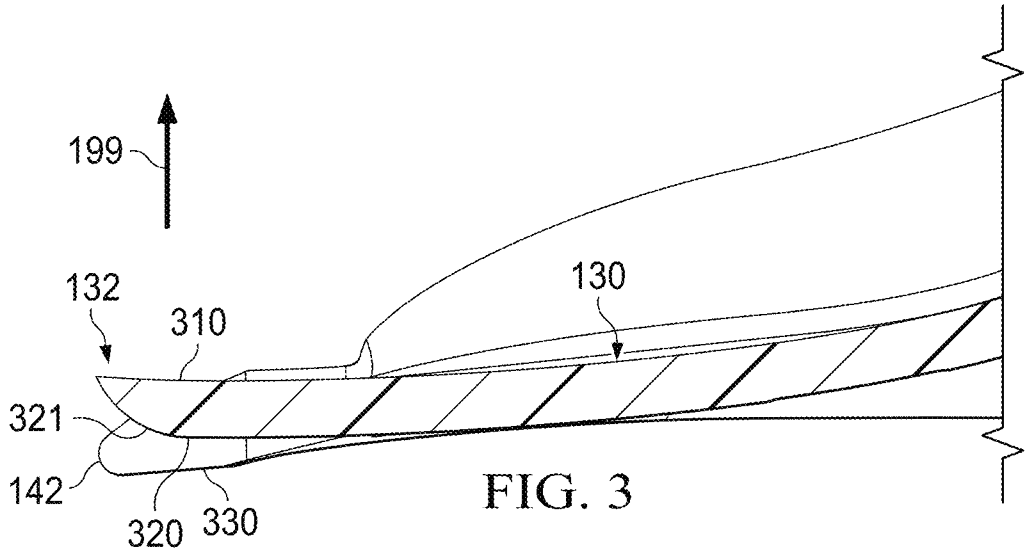
FIG. 3 illustrates an example, non-limiting cross-sectional side view taken along A-A of FIG. 2 depicting a spring element integrally extending from the head portion of the handle of FIG. 1, in accordance with one or more embodiments described herein.

FIGS. 1-3 illustrate views of an example, non-limiting handle 100 for a razor, in accordance with one or more embodiments described herein. In particular, FIG. 1 illustrates an isometric view depicting handle 100, FIG. 2 illustrates an isometric view depicting a head portion 120 of handle 100, and FIG. 3 illustrates a cross-sectional side view depicting a spring element integrally extending from head portion 120. With reference to FIGS. 1-3, handle 100 can comprise a body portion 110 and head portion 120 that longitudinally opposes body portion 110 in a longitudinal direction 197. Body portion 110 can facilitate grasping handle 100 to control and/or maneuver handle 100 for shaving. Head portion 120 can facilitate coupling razor cartridges (e.g., razor cartridge 500 of FIGS. 4-8) in pivotal relation with handle 100.

Handle 100 can further comprise a spring element 130 having a distal end 132 and a proximal end 134 that longitudinally opposes distal end 132 in longitudinal direction 197. As shown in the embodiment depicted by FIG. 1, spring element 130 can comprise a substantially planar or flat structure (e.g., akin to a diving board). For example, as best seen in FIG. 3, the upper surface 310 of spring element 130 inclusive of distal end 132 can be desirably flat or planar. As discussed in greater detail below with respect to FIGS. 11-13, proximal end 134 can longitudinally oppose distal end 132 to define an arc length of spring element 130. FIGS. 1-2 show that spring element 130 extends integrally from head portion 120 at proximal end 134. That is, handle 100 can define a single, unitary structure formed by body portion 110, head portion 120, spring element 130, and pivot structure 140. In an embodiment, providing spring element 130 as an integral component of the single, unitary structure of handle 110 can mitigate the manufacturability challenges, increased manufacturing costs, and/or additional modes of mechanical failure discussed above with respect to implementing a handle with multiple components being involved in biasing a razor cartridge.

As best seen in FIG. 3, spring element 130 can comprise an abutment surface 320 that vertically opposes an upper surface 310 of spring element 130 in a vertical direction 199. In the embodiment depicted by FIG. 3 depicts an embodiment in which abutment surface 320 comprises a curvature as indicated in curved end portion 321. Curved end portion 321 can enhance a relative smoothness by which abutment surface 320 travels in sliding engagement with a cam surface (e.g., cam surface 540 of FIG. 5) of a razor cartridge. In other embodiments, abutment surface 320 can be substantially linear. For example, abutment surface 320 can comprise an orthogonal or non-curved end portion. Spring element 130 can deflect as abutment surface 320 travels in sliding engagement with a cam surface of a razor cartridge while exerting progressively increasing return torque as the razor cartridge rotates about a front pivot axis. In the embodiment depicted by FIGS. 1-3, spring element 130 is a cantilever that lacks support external to an interface between head portion 120 and proximal end 134. In an embodiment, handle 100 can comprise one or more elements that support spring element 130 external to the interface between head portion 120 and proximal end 134.

Handle 100 can further comprise pivot structure 140 extending from head portion 120 that can engage with a razor cartridge (e.g., razor cartridge 500 of FIGS. 4-8) to define a front pivot axis (e.g., front pivot axis 498 of FIGS. 4-8). Pivot structure 140 can comprise pivot arms 142 and 144 that can engage with the razor cartridge on laterally opposing sides of spring element 130 to define the front pivot axis. That is, a position of pivot arm 142 with respect to spring element 130 can laterally oppose a position of pivot arm 144 with respect to spring element 130 in a lateral direction 198. In an embodiment, a relative position of spring element 130 with respect to pivot arms 142 and 144 can facilitate protecting spring element 130 during shave strokes by positioning spring element 130 within a side profile of pivot structure 140.

In the embodiment depicted by FIGS. 1-3, abutment surface 320 can be offset in vertical direction 199 with respect to respective lower surfaces of pivot arms 142 and 144 when pivot structure 140 is unengaged with a razor cartridge. For example, FIG. 3 shows abutment surface 320 being offset in vertical direction 199 with respect to a lower surface 330 of pivot arm 142 when pivot structure 140 is unengaged with a razor cartridge. In an embodiment, abutment surface 320 can be substantially planar with respective lower surfaces of pivot arms 142 and 144. For example, abutment surface 320 and lower surface 330 of pivot arm 142 can exist in a common plane when pivot structure 140 is unengaged with a razor cartridge.

Figure 4:
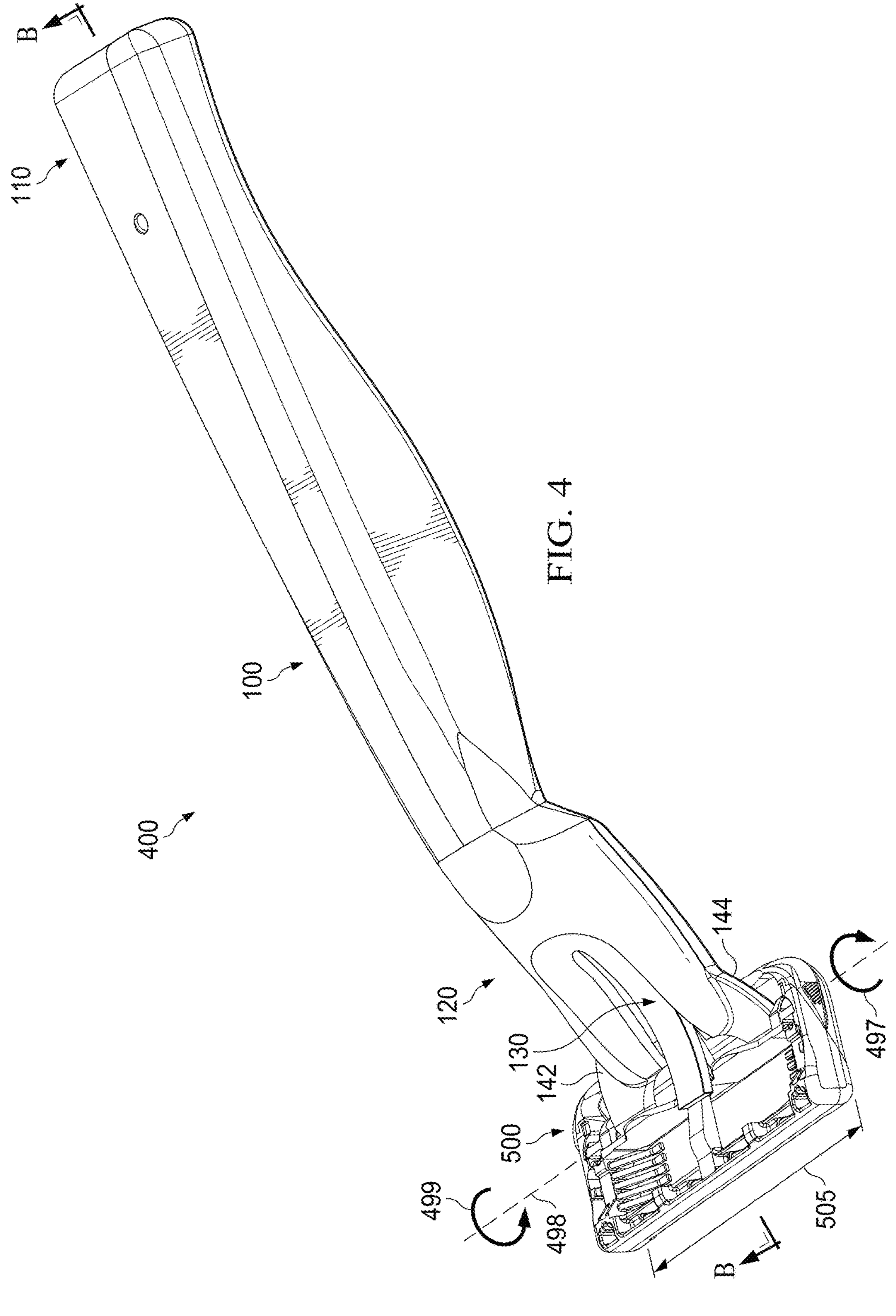
FIG. 4 illustrates an example, non-limiting isometric view depicting a razor comprising the handle of FIG. 1 coupled to a razor cartridge, in accordance with one or more embodiments described herein.
Figure 5:
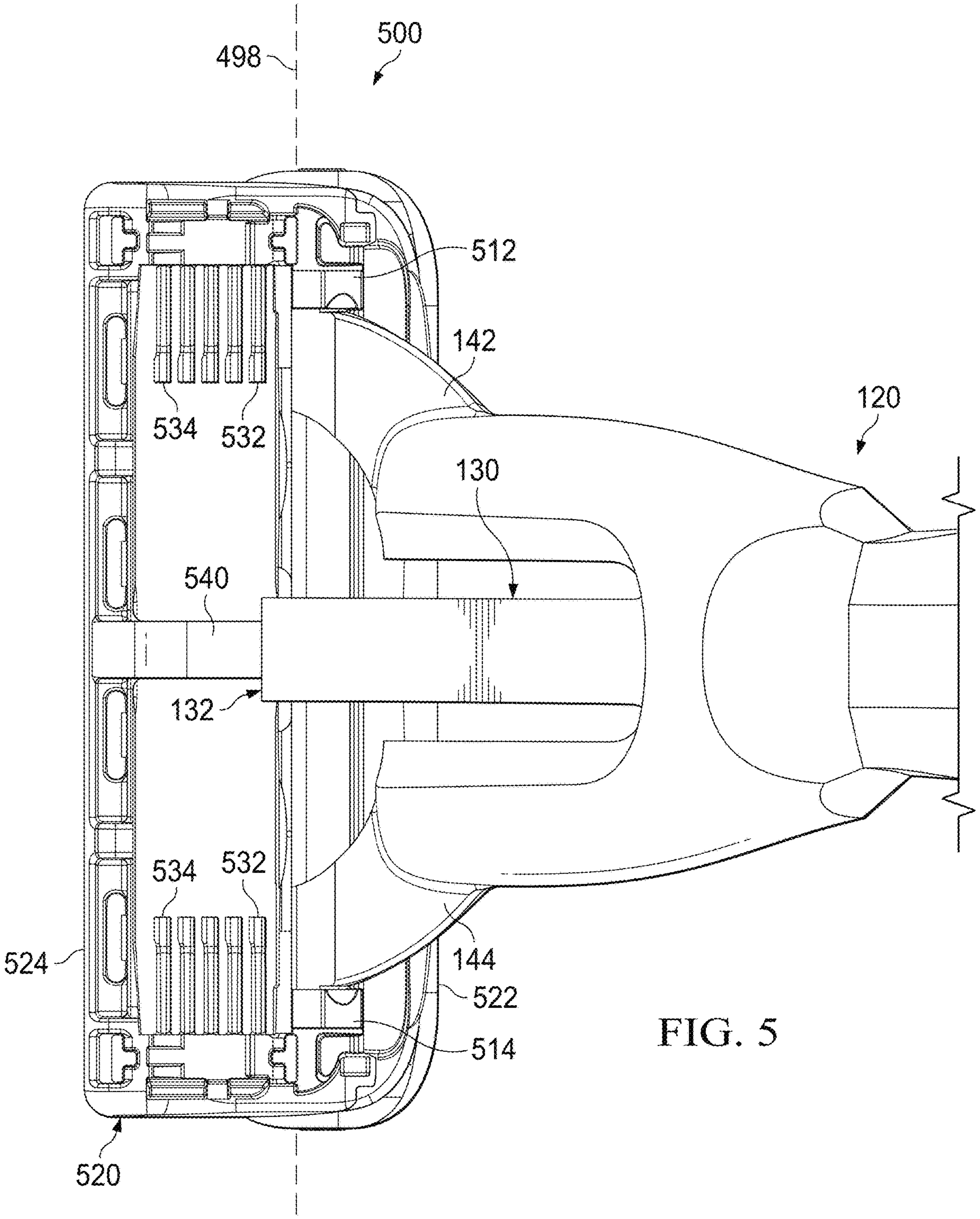
FIG. 5 illustrates an example, non-limiting top view depicting the razor cartridge of FIG. 4, in accordance with one or more embodiments described herein.
Figure 8:
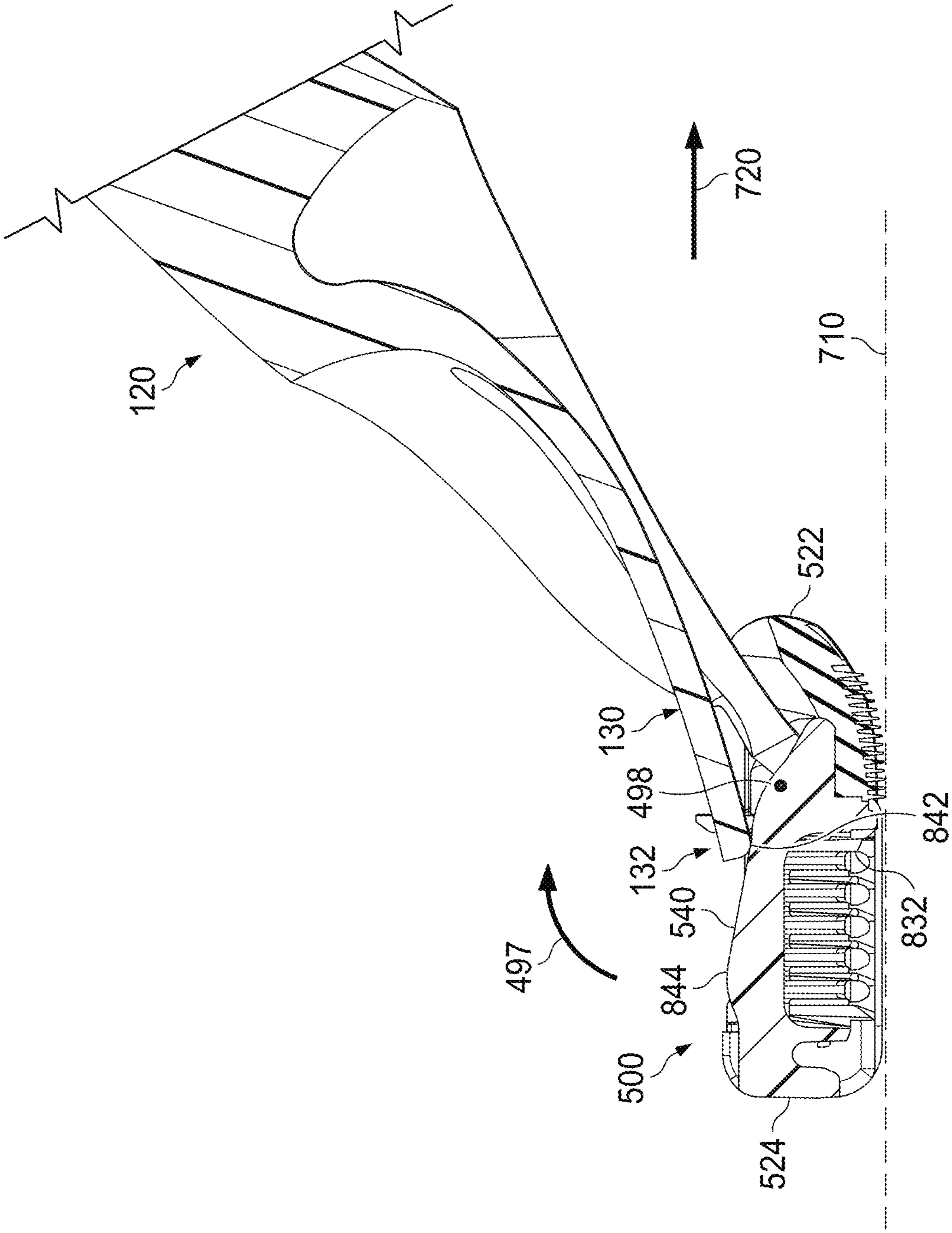
FIG. 8 illustrates an example, non-limiting cross-sectional view taken along B-B of FIG. 4 depicting the razor of FIG. 4, in accordance with one or more embodiments described herein.

FIG. 4 illustrates an example, non-limiting isometric view depicting a razor 400, in accordance with one or more embodiments described herein. As shown by FIG. 4, razor 400 can comprise a razor cartridge 500 coupled in pivotal relation with handle 100 about front pivot axis 498. With reference to FIG. 5, razor cartridge 500 can comprise a housing 520 that includes a front edge 522 associated with front pivot axis 498 and a rear edge 524. Razor cartridge 500 can further comprise pivot elements 512 and 514 that can engage with pivot arms 142 and 144 of pivot structure 140, respectively, to define front pivot axis 498. For example, pivot elements 512 and 514 can be recesses within housing 520 that can receive pivot arms 142 and 144 of pivot structure 140, respectively, to couple razor cartridge 500 in pivotal relation with handle 100 about front pivot axis 498. As best seen in FIG. 8, pivot structure 140 can engage with razor cartridge 500 at a position that intervenes between a foremost blade (corresponding to reference designator 832) of razor cartridge 500 and head portion 120.

Figure 6:
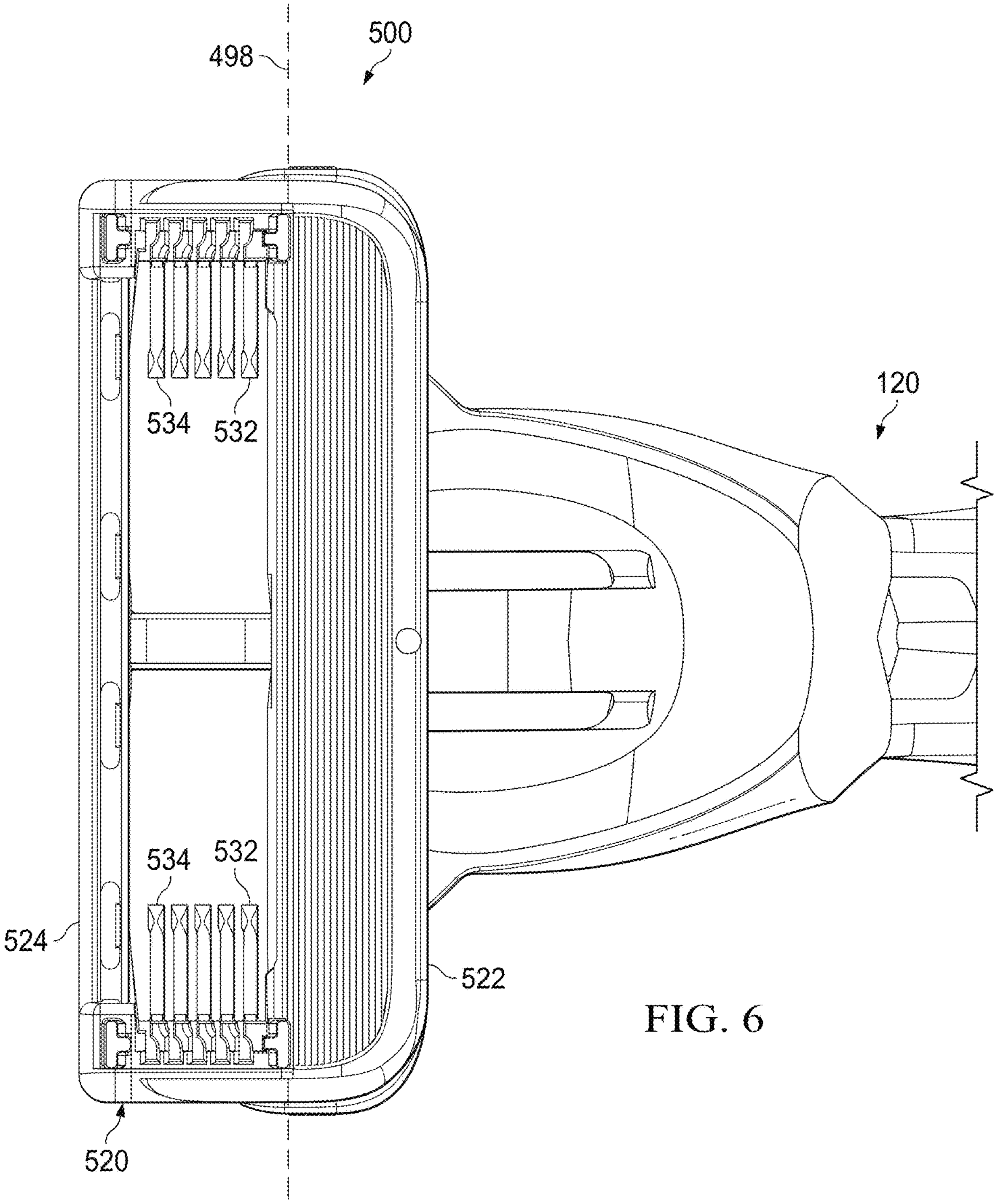
FIG. 6 illustrates an example, non-limiting bottom view depicting the razor cartridge of FIG. 4, in accordance with one or more embodiments described herein.
Figure 7:
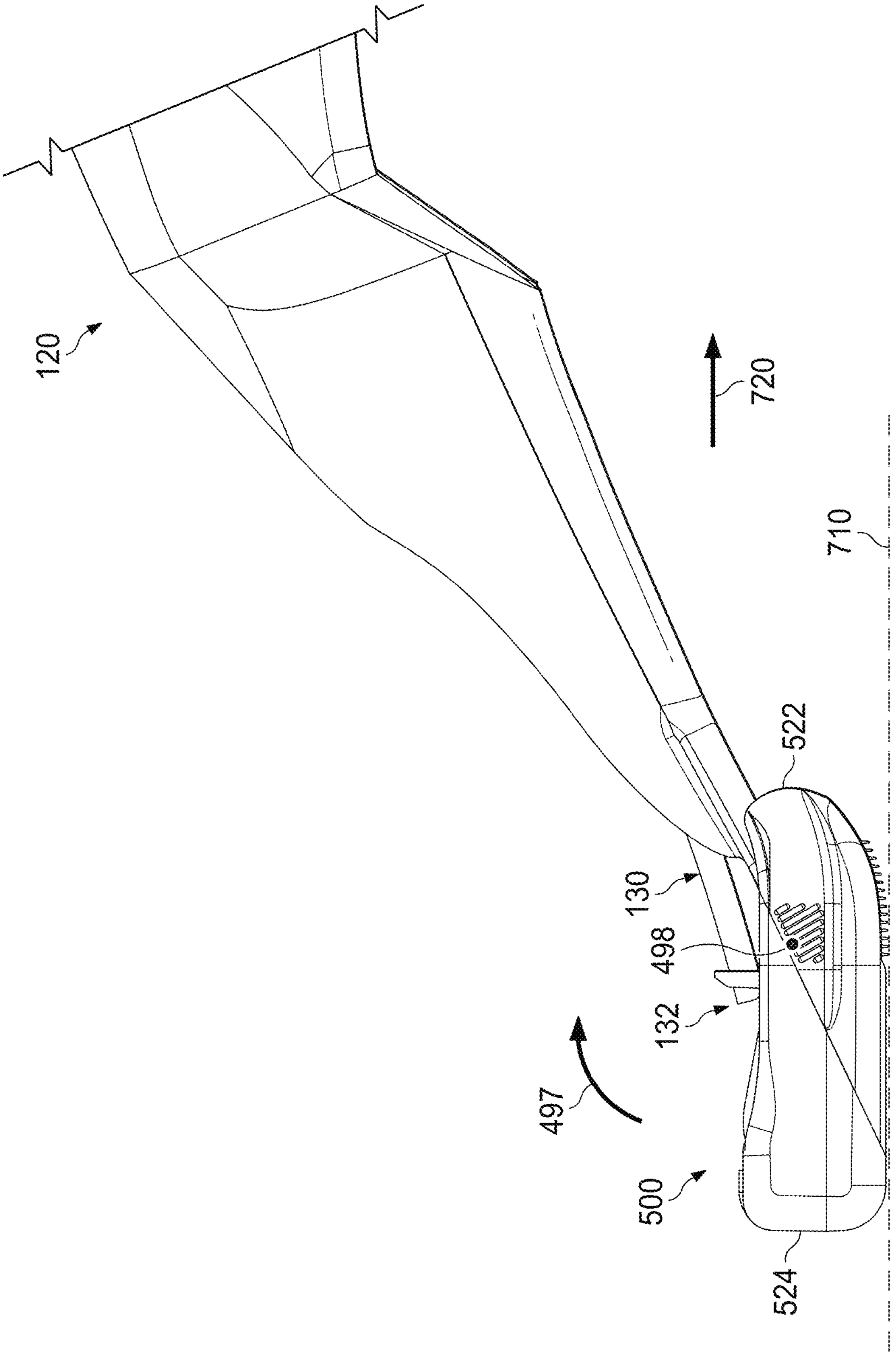
FIG. 7 illustrates an example, non-limiting side view depicting the razor of FIG. 4, in accordance with one or more embodiments described herein.

Razor cartridge 500 can further comprise one or more blades (not depicted) disposed in housing 520. A blade disposed in housing 520 can be coupled to razor cartridge 500 via a respective pair of resilient arms. For example, FIGS. 5-6 depict razor cartridge 500 as comprising five pairs of resilient arms that include a rearmost pair of resilient arms 534 and a foremost pair of resilient arms 532. In this embodiment, razor cartridge 500 can comprise five blades disposed in housing 520 that can include a foremost blade and a rearmost blade (neither depicted) coupled to razor cartridge 500 via the foremost pair of resilient arms 532 and the rearmost pair of resilient arms 534, respectively. In other embodiments, razor cartridge 500 can comprise fewer blades (e.g., one blade) or more blades (e.g., six blades) disposed within housing 520. With reference to FIGS. 7-8, razor cartridge 500 can comprise a shaving plane 710 that corresponds to cutting edges of the one or more blades disposed within housing 520. Such cutting edges that correspond to shaving plane 710 can be moved across a skin surface in a direction 720 for shaving.

Figure 9:
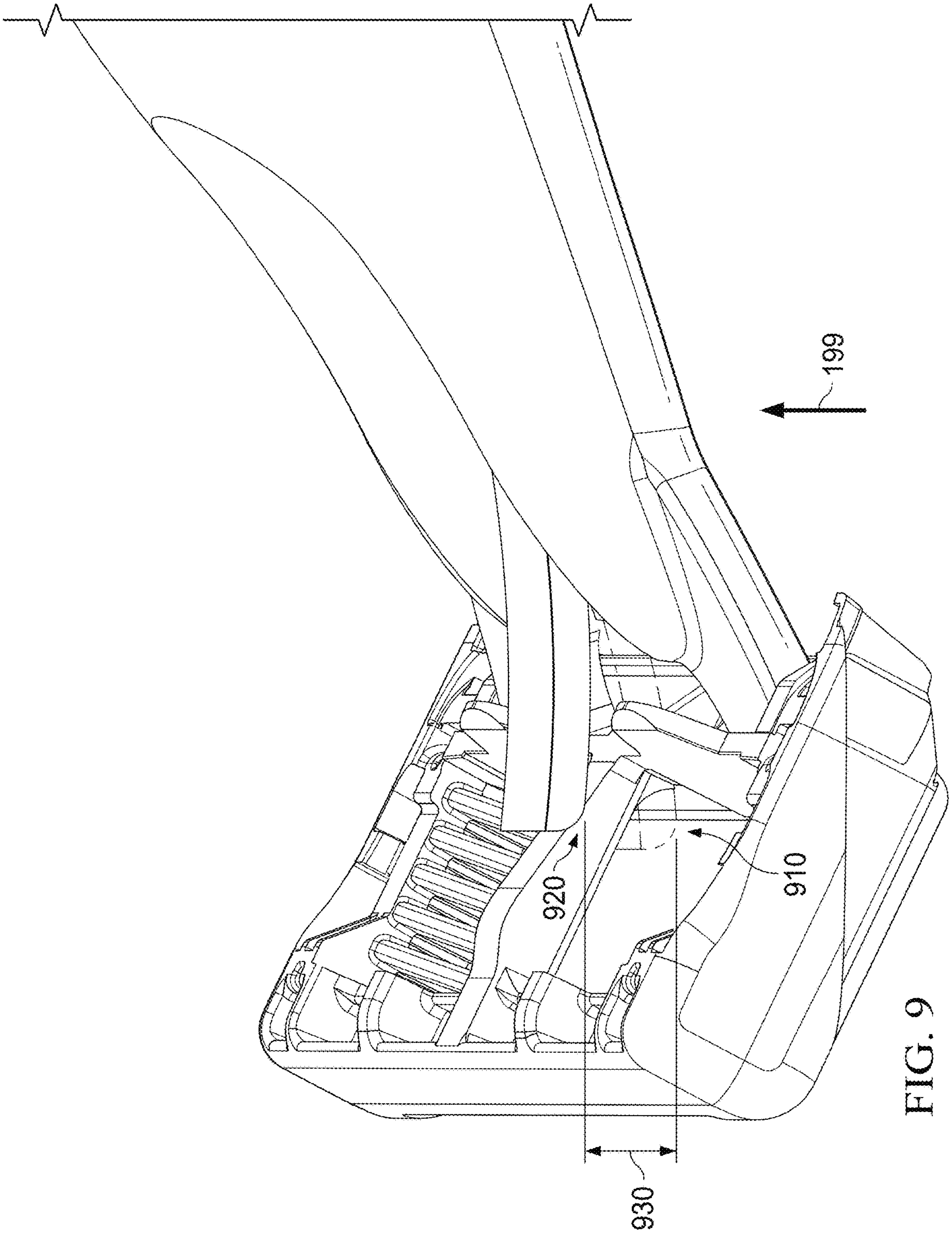
FIG. 9 illustrates an example, non-limiting side view depicting a neutral position of the razor cartridge of FIG. 4, in accordance with one or more embodiments described herein.

With reference to FIGS. 4-5, razor cartridge 500 can further comprise a cam surface 540 that can be located at the center of a length 505 of razor cartridge 500. Cam surface 540 can substantially extend between the front edge 522 and the rear edge 524 of housing 520. In this embodiment, cam surface 540 can be convex. In other embodiments, at least, a portion of cam surface 540 can be non-convex (e.g., concave). Spring element 130 can deflect when the abutment surface 320 on distal end 132 of spring element 130 engages with cam surface 540. For example, and with reference to FIG. 9, abutment surface 320 can be located at a first height location 910 in vertical direction 199 when pivot structure 140 is unengaged with a razor cartridge, such as depicted in FIG. 1. Abutment surface 320 can transition from the first height location 910 to a second height location 920 in vertical direction 199 when pivot structure 140 engages with a razor cartridge in a neutral position, as depicted in FIG. 4. When pivot structure 140 engages with the razor cartridge in the neutral position, spring element 130 can deflect by a preload distance 930 that can be defined as a distance between first height location 910 and second height location 920 in vertical direction 199. Spring element 130 can deflect by preload distance 930 to exert a non-zero return torque when the razor cartridge is in the neutral position. In an embodiment, preload distance 930 can range from about 0 to about 1.5 times a height (e.g., height 1340 of FIG. 13) of spring element 130.

Figure 10:
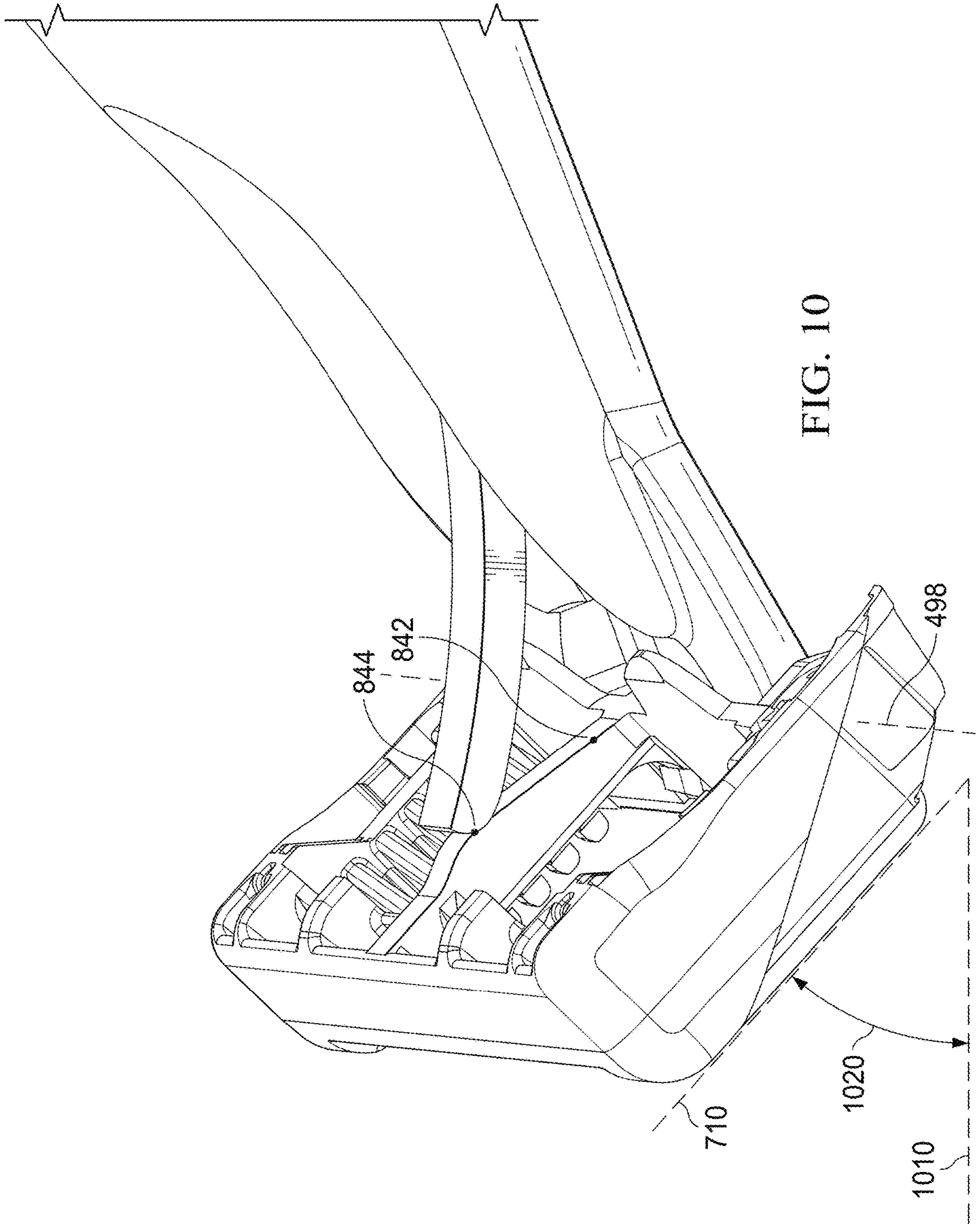
FIG. 10 illustrates an example, non-limiting side view depicting a rotated position of the razor cartridge of FIG. 4, in accordance with one or more embodiments described herein.

With reference to FIG. 4, razor cartridge 500 can rotate about front pivot axis 498 in a clockwise direction 497 such that rear edge 524 approaches handle 110. As razor cartridge 500 rotates about front pivot axis 498 in the clockwise direction 497, razor cartridge 500 can transition from the neutral position depicted in FIG. 4 to a rotated position depicted in FIG. 10. A comparison between FIGS. 8 and 10 illustrates that shaving plane 710 can be unencumbered by abutment surface 320 during shaving whether razor cartridge 500 is in the neutral position or the rotated position. Moreover, the shaving plane 710 of razor cartridge 500 can also rotate as razor cartridge 500 rotates about front pivot axis 498. For example, designator 1010 can define a neutral position orientation of shaving plane 710 (e.g., an orientation of the shaving plane 710 when razor cartridge 500 is in the neutral position depicted by FIG. 4). As razor cartridge 500 rotates about front pivot axis 498 towards the rotated position depicted in FIG. 10, an angle 1020 between that neutral position orientation 1010 of shaving plane 710 and a current orientation of shaving plane 710 can increase. Inversely, as razor cartridge 500 rotates about front pivot axis 498 in a counter-clockwise direction 499, razor cartridge 500 can transition from the rotated position depicted in FIG. 10 to the neutral position depicted in FIG. 4. As razor cartridge 500 rotates about front pivot axis 498 towards the neutral position depicted in FIG. 4, angle 1020 can decrease.

In accordance with one or more embodiments, spring element 130 can deflect as abutment surface 320 on distal end 132 travels in sliding engagement with cam surface 540 to exert progressively increasing return torque as razor cartridge 500 rotates about front pivot axis 498. As discussed above, spring element 130 can deflect by a preload distance (e.g., preload distance 930 of FIG. 9) to exert a non-zero return torque when razor cartridge 500 is in the neutral position depicted in FIG. 4. When razor cartridge 500 is in the neutral position, abutment surface 320 can engage with cam surface 540 at a start point of cam surface 540 proximate to front pivot axis 498.

For example, and with reference to FIG. 8, abutment surface 320 on the distal end 132 of spring element 130 can engage with start point 842 of cam surface 540 when razor cartridge 500 is in the neutral position. In this example, angle 1020 can progressively increase as razor cartridge 500 rotates about front pivot axis 498 in the clockwise direction 497 from the neutral position towards the rotated position depicted in FIG. 10. As angle 1020 progressively increases, abutment surface 320 can travel in sliding engagement with cam surface 540 from start point 842 towards an end point 844 of cam surface 540 that can fall proximal to rear edge 524. As abutment surface 320 travels in sliding engagement with cam surface 540 from start point 842 towards end point 844, a height of abutment surface 320 in vertical direction 199 can progressively increase. That progressively increasing height of abutment surface 320 can progressively increase a distance that spring element 130 deflects in vertical direction 199 to progressively increase a return torque that spring element 130 exerts from the non-zero return torque that spring element 130 exerts in the neutral position.

As another example, abutment surface 320 can engage with end point 844 of cam surface 540 when razor cartridge 500 is in the rotated position depicted in FIG. 10. In this example, angle 1020 can progressively decrease as razor cartridge 500 rotates about front pivot axis 498 in the counter-clockwise direction 499 from the rotated position towards the neutral position depicted in FIG. 4. As angle 1020 progressively decreases, abutment surface 320 can travel in sliding engagement with cam surface 540 from end point 844 towards start point 842 of cam surface 540. As abutment surface 320 travels in sliding engagement with cam surface 540 from end point 844 towards start point 842, a height of abutment surface 320 in vertical direction 199 can progressively decrease. That progressively decreasing height of abutment surface 320 can progressively decrease a distance that spring element 130 deflects in vertical direction 199 to progressively decrease a return torque that spring element 130 exerts.

In an embodiment and in view of the preceding examples, abutment surface 320 of spring element 130 can travel in sliding engagement with cam surface 540 between a position (e.g., corresponding to designator 832 of FIG. 8) ahead of a foremost blade coupled to the foremost pair of resilient arms 532 with respect to the direction 720 for shaving and past a position of a rearmost blade coupled to the rearmost pair of resilient arms 534, as razor cartridge 500 rotates about front pivot axis 498 in clockwise direction 497. In this embodiment, as abutment surface 320 travels in sliding engagement with cam surface 540 from that position ahead of the foremost blade to that position past the rearmost blade, a distance that spring element 130 deflects in vertical direction 199 can progressively increase while spring element 130 exerts progressively increasing return torque. In this embodiment, as abutment surface 320 travels in sliding engagement with cam surface 540 from that position past the rearmost blade to that position ahead of the foremost blade, a distance that spring element 130 deflects in vertical direction 199 can progressively decrease while sliding element 130 exerts progressively decreasing return torque. Such a return torque profile can improve razor performance (e.g., shave closeness and/or glide) by facilitating conformance between a skin surface and shaving plane 710 during shaving.

Figure 11:
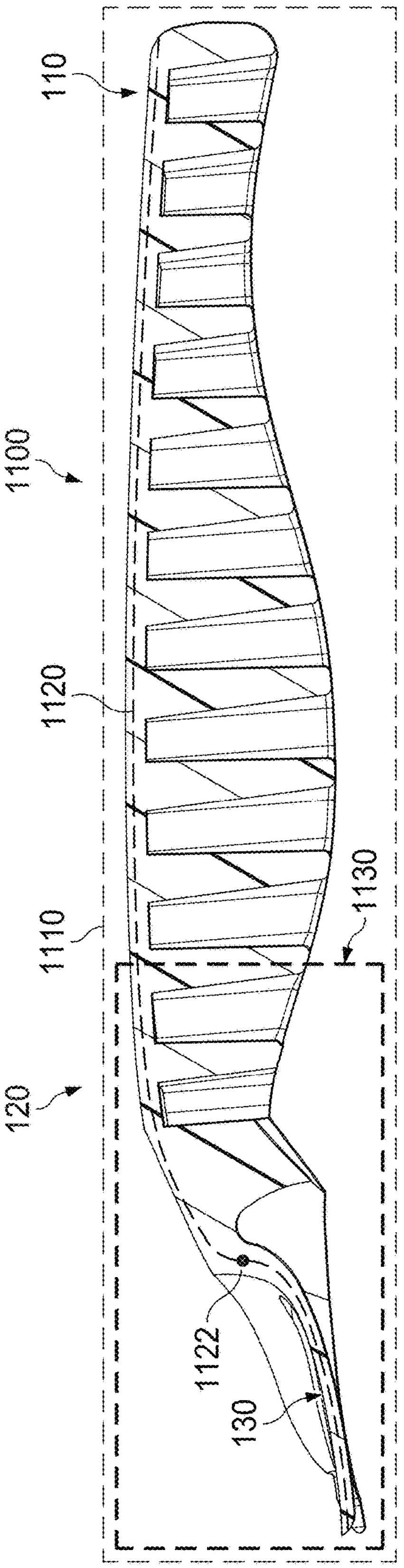
FIG. 11 illustrates an example, non-limiting cross-sectional view depicting an arcuate profile of the handle of FIG. 1, in accordance with one or more embodiments described herein.
Figure 12:
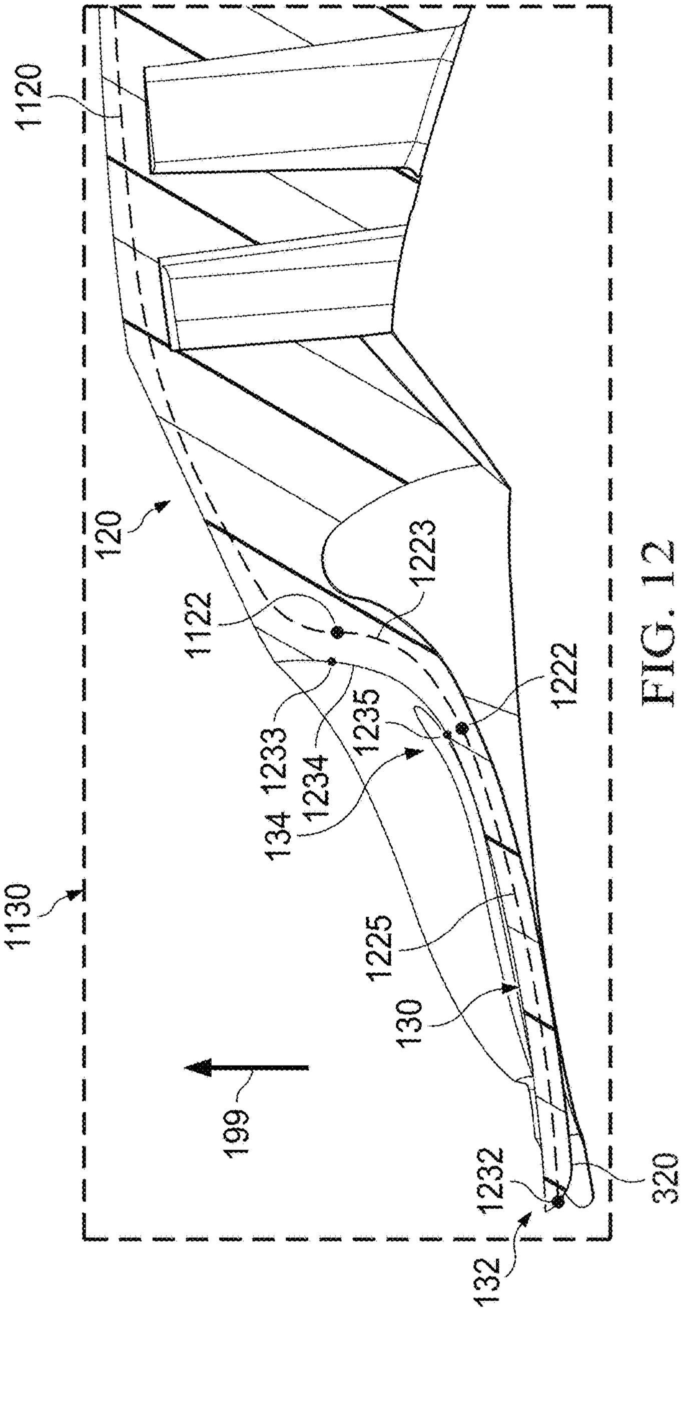
FIG. 12 illustrates an example, non-limiting cross-sectional view of the arcuate profile of FIG. 11 proximate to the spring element, in accordance with one or more embodiments described herein.
Figure 13:
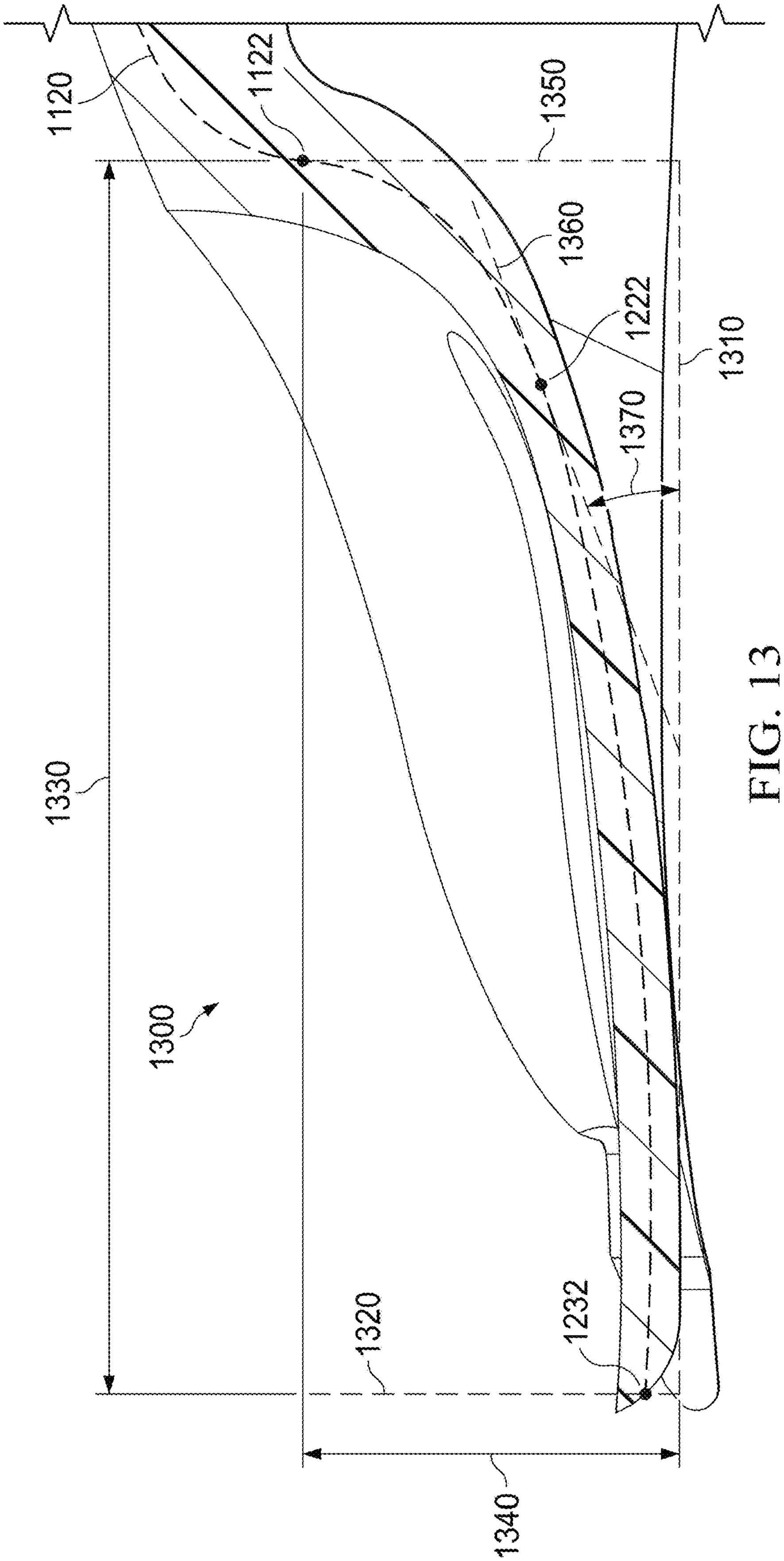
FIG. 13 illustrates another example, non-limiting cross-sectional view of the arcuate profile of FIG. 11 proximate to the spring element, in accordance with one or more embodiments described herein.

FIGS. 11-13 illustrate cross-sectional views depicting an example, non-limiting arcuate profile 1120 of handle 100, in accordance with one or more embodiments described herein. In particular, FIG. 11 illustrates an example, non-limiting cross-sectional view 1100 of the arcuate profile 1120 of handle 100; FIG. 12 illustrates an example, non-limiting cross-sectional view 1130 proximate to spring element 130; and FIG. 13 illustrates another non-limiting cross-sectional view 1300 of the arcuate profile 1120 proximate to spring element 130. FIG. 11 shows that the arcuate profile 1120 of handle 100 can extend longitudinally along handle 100 from body portion 110 towards head portion 120 in a sagittal plane 1110. As best seen in FIG. 12, the arcuate profile 1120 of handle 100 can comprise an inflection point 1122. In an embodiment, inflection point 1122 can be associated with an interface between head portion 120 and the proximal end 134 of spring element 130.

FIG. 12 also shows that a curvature of spring element 130 can vary between inflection point 1122 and a terminus 1232 of spring element 130. For example, arcuate profile 1120 can comprise a transition point 1222. In this example, arcuate profile 1120 can comprise a first curvature and a second curvature. The first curvature can be a curvature associated with a first segment 1223 of arcuate profile 1120 that extends between inflection point 1122 and transition point 1222. The second curvature can be a curvature associated with a second segment 1225 of arcuate profile 1120 that extends between transition point 1222 and terminus 1232. As shown by FIG. 12, the first curvature associated with first segment 1223 can be greater than the second curvature associated with second segment 1225. The first curvature associated with first segment 1223 can also correspond to an arcuate surface 1234 of spring element 130. As shown by FIG. 12, the arcuate surface 1234 of spring element 130 can be disposed proximate to inflection point 1122. The arcuate surface 1234 can also substantially vertically oppose abutment surface 320 of spring element 130 in vertical direction 199. The arcuate surface 1234 can generally extend along the spring element 130 from a first point 1233 to a second point 1235. In an embodiment and with reference to FIG. 13, a position of transition point 1222 can be defined using an intersection angle 1370 between an arc tangent of arcuate profile 1120 and an abutment surface plane 1310. For example, intersection angle 1370 can be less than 45 degrees. As another example, intersection angle 1370 can be 30 degrees.

In an embodiment, the varying curvature of spring element 130 between inflection point 1122 and terminus 1232 can define a "low swoop" arcuate profile for spring element 130. One aspect of such a low swoop arcuate profile can involve reducing an angle via which spring element 130 approaches a cam surface (e.g., cam surface 540). Reducing that angle can mitigate deformation and/or stress imparted on spring element 130 by the cam surface of a razor cartridge coupled to handle 100 via a front pivot axis. In an embodiment, the varying curvature of spring element 130 between inflection point 1122 and terminus 1232 can facilitate mitigating stresses imparted on spring element 130 during shaving. In an embodiment, mitigating stresses imparted on spring element 130 during shaving can facilitate reducing performance decay of spring element 130 within an expected product life duration. In an embodiment, positioning transition point 1222 closer to inflection point 1122 can facilitate increasing an arc length of spring element 130.

FIG. 13 illustrates an example, non-limiting cross-sectional view 1300 of arcuate profile 1120 proximate to spring element 130, in accordance with one or more embodiments described herein. As shown by FIG. 13, inflection point 1122, transition point 1222, and/or terminus 1232 can facilitate defining various geometrical properties of spring element 130. For example, spring element 130 can comprise an arc length, a height 1340, and a length 1330. In an embodiment, the arc length of spring element 130 can be defined using inflection point 1122 and terminus 1232 as opposing endpoints of the arc length. In an embodiment, a point of tangency between an arc of spring element 130 and a plane 1350 that is perpendicular to an abutment surface plane 1310 and terminus 1232 can define opposing endpoints of the arc length of spring element 130. In an embodiment, the height 1340 of spring element 130 can be defined as a distance in vertical direction 199 between abutment surface 320 and inflection point 1122. In an embodiment, the length 1330 of spring element can be defined as a distance in longitudinal direction 197 between a plane 1320 orthogonal with terminus 1232 and inflection point 1122. In an embodiment, the length 1330 of spring element can be defined as a distance in longitudinal direction 197 between a plane 1320 orthogonal with terminus 1232 and a point of tangency between an arc of spring element 130 and plane 1350.

Figure 14:
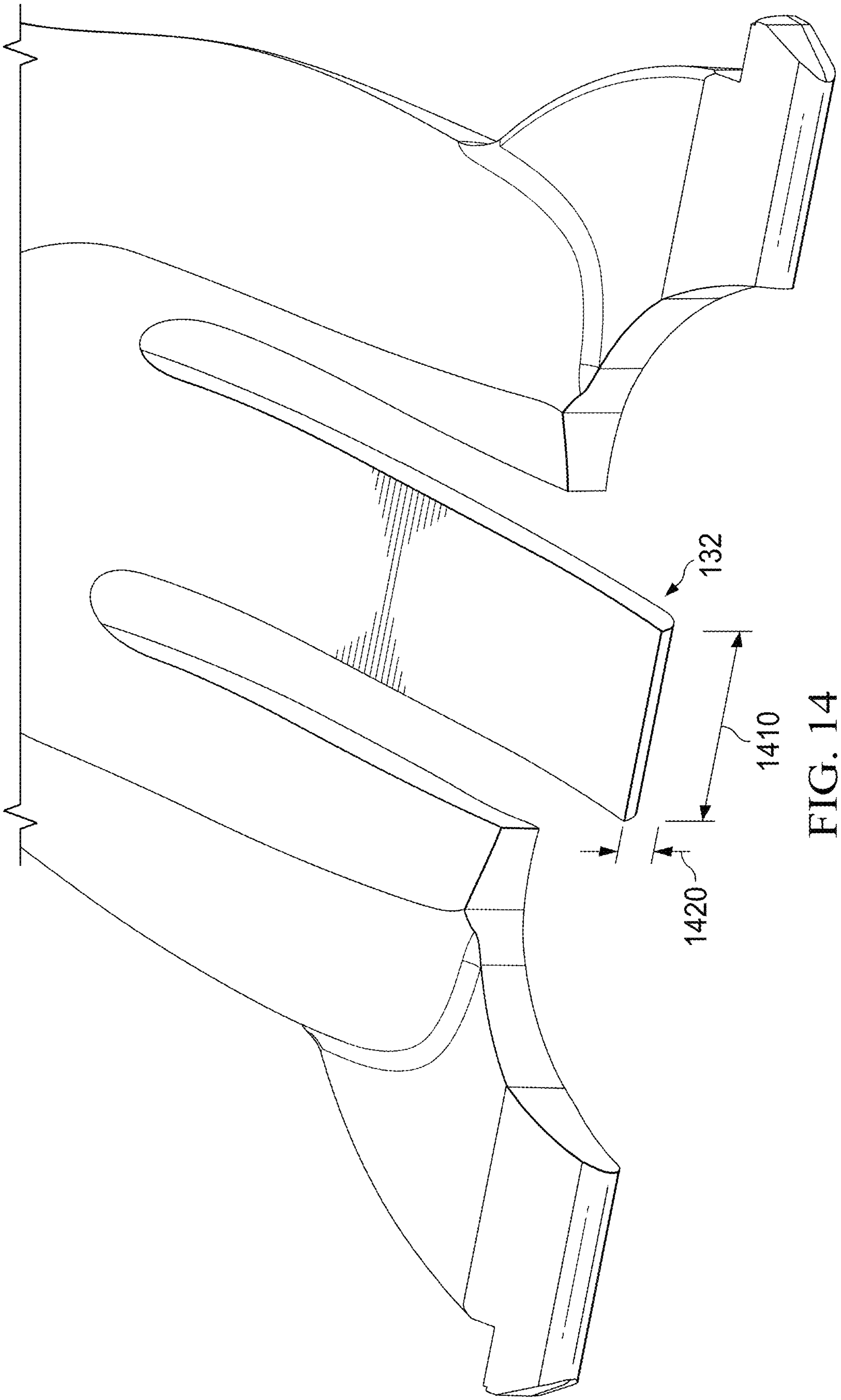
FIG. 14 illustrates an example, non-limiting isometric view depicting a distal end of the spring element of FIG. 1, in accordance with one or more embodiments described herein.

As shown by FIG. 14, spring element 130 can comprise further geometrical properties, such as a width 1410 and a thickness 1420. In an embodiment, the thickness 1420 of spring element 130 at distal end 132 can range from 0.1 millimeter (mm) to 3.0 mm. In an embodiment, a size and/or shape of width 1410 can be designed to reduce an impact of spring element 130 on rinsing shaving debris from razor cartridge 500 while maintaining sufficient contact between spring element 130 and cam surface 540. In an embodiment, the width 1410 of spring element 130 can remain substantially consistent between distal end 132 and proximal end 134. In an embodiment, the width 1410 of spring element 130 can vary between distal end 132 and proximal end 134. For example, and with reference to FIG. 15, spring element 1500 can comprise a distal end 1532 having a width that is less than a width of a proximal end 1534. As another example and with reference to FIG. 16, spring element 1600 can comprise a distal end 1632 having a width that is greater than a width of a proximal end 1634. In an embodiment and with reference to FIG. 14, the thickness 1420 of spring element 130 can remain substantially consistent between distal end 132 and proximal end 134. In an embodiment, the thickness 1420 of spring element 130 can vary between distal end 132 and proximal end 134. For example, and with reference to FIG. 15, spring element 1500 can comprise a distal end 1532 having a thickness that is less than a thickness of a proximal end 1534.

In an embodiment, aspects of spring element 130 can be defined using ratios between different geometrical properties of spring element 130. In an embodiment, a ratio between the arc length of spring element 130 and a width (e.g., width 1410) of distal end 132 can range from about 1.3 to about 12. In an embodiment, a ratio between the arc length of spring element 130 and height 1340 can range from about 0.5 to about 20. In an embodiment, a ratio between the arc length of spring element 130 and length 1330 can range from about 0.5 to about 0.99.

Figure 15:
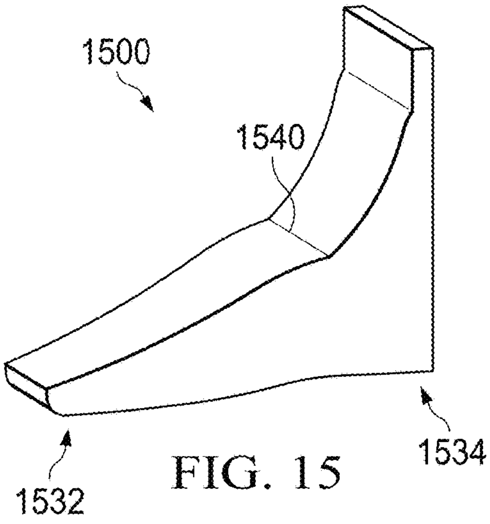
FIGS. 15-18 illustrate isometric views depicting example, non-limiting spring elements, in accordance with one or more embodiments described herein.
Figure 16:
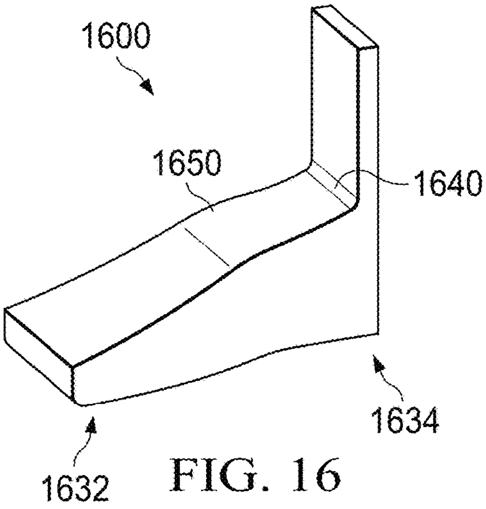
Figure 17:
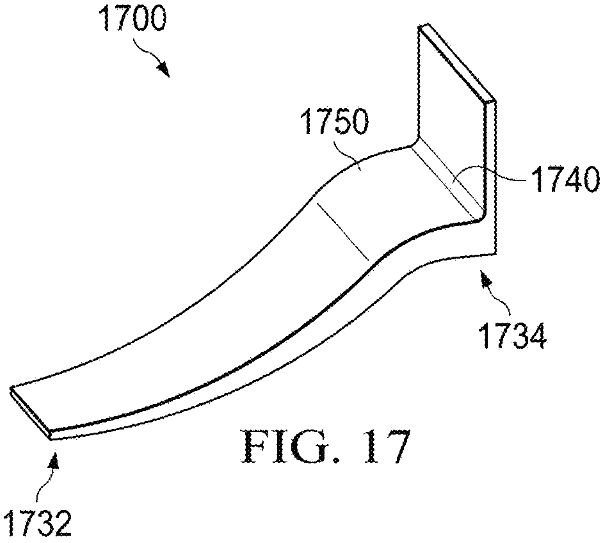
Figure 18:
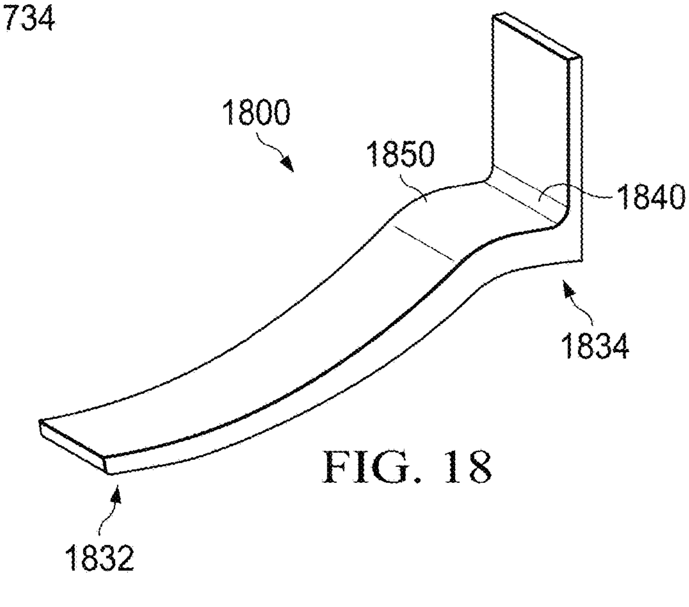

FIGS. 15-18 illustrate isometric views depicting example, non-limiting spring elements, in accordance with one or more embodiments described herein. As shown by FIG. 15, spring element 1500 can comprise a discontinuity point 1540 within a curvature of spring element 1500. As shown by FIGS. 16-18, a spring element can comprise multiple inflection points. For example, spring element 1600 comprises inflection points 1640 and 1650; spring element 1700 comprises inflection points 1740 and 1750; and spring element 1800 comprises inflection points 1840 and 1850.

Figure 20:
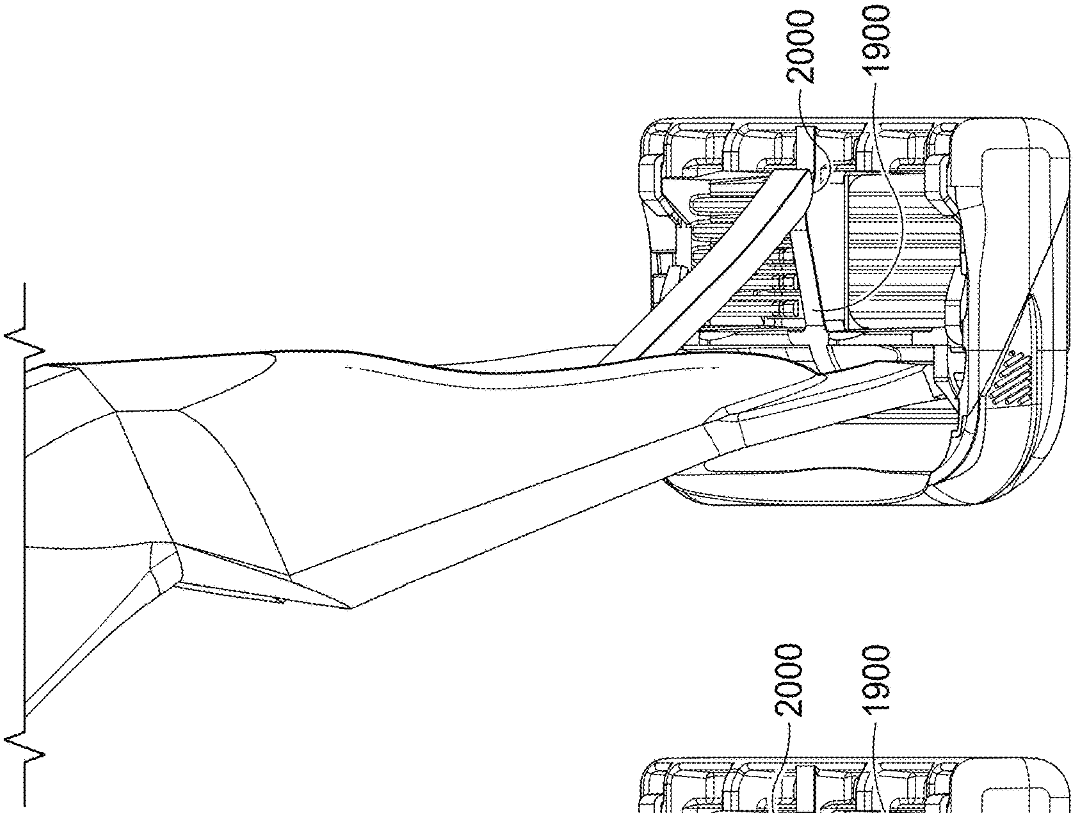
FIG. 20 illustrates an example, non-limiting isometric view depicting the razor of FIG. 19 with the razor cartridge in a rotated position, in accordance with one or more embodiments described herein.
Figure 19:
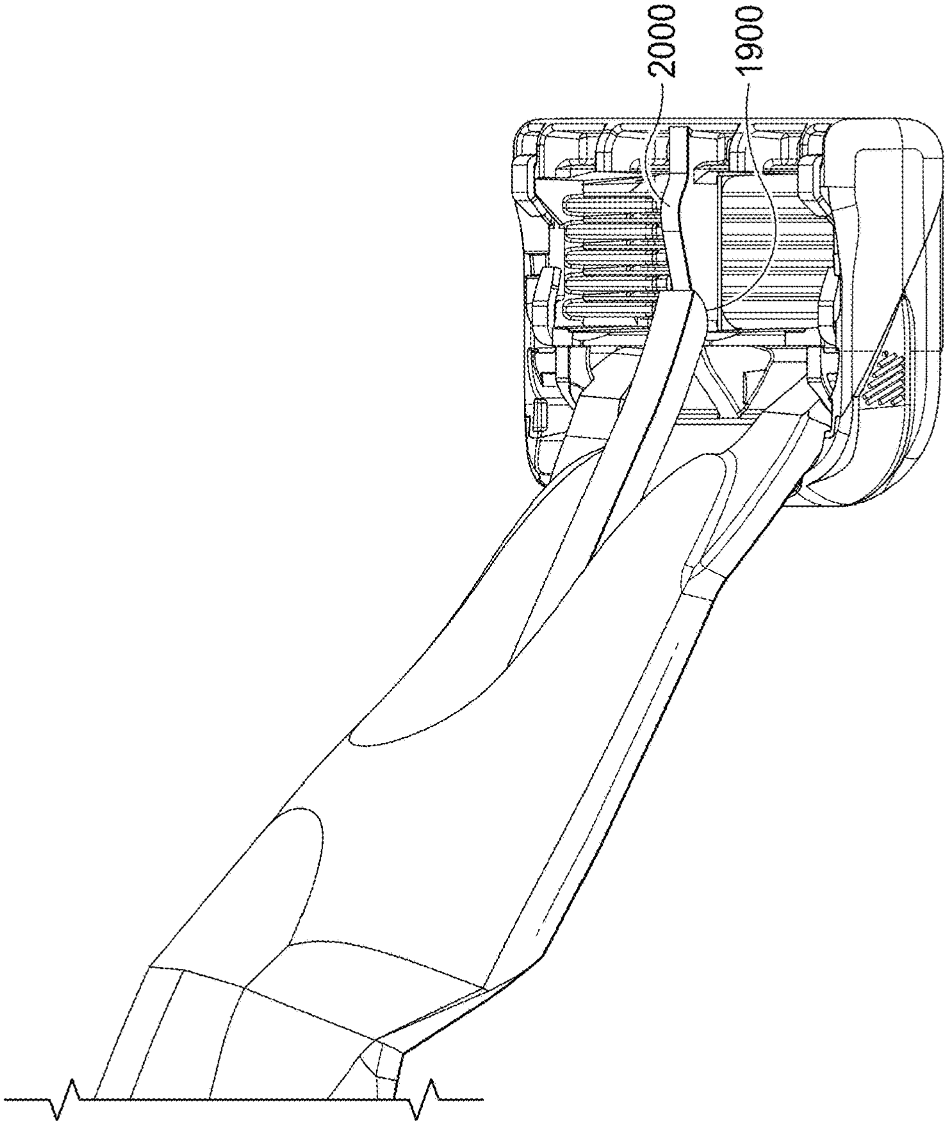
FIG. 19 illustrates an example, non-limiting isometric view depicting a razor with a razor cartridge in a neutral position, in accordance with one or more embodiments described herein.

FIG. 19 illustrates an example, non-limiting isometric view depicting a razor with a razor cartridge in a neutral position, in accordance with one or more embodiments described herein. FIG. 20 illustrates an example, non-limiting isometric view depicting the razor of FIG. 19 with the razor cartridge in a rotated position, in accordance with one or more embodiments described herein. A comparison between FIGS. 19 and 20 illustrates an example travel path of a spring element as the razor cartridge transitions from the neutral position depicted in FIG. 19 to the rotated position depicted in FIG. 20. The example travel path illustrated by the comparison between FIGS. 19 and 20 includes a starting point 1900 and an ending point 2000.

Examples/Combinations

A. A handle for a razor, the handle comprising:
  a) a head portion that facilitates coupling razor cartridges in pivotal relation with the handle; and
  b) a spring element having a distal end and a proximal end that longitudinally opposes the distal end to define an arc length of the spring element, wherein the spring element extends integrally from the head portion at the proximal end, wherein the spring element deflects as an abutment surface on the distal end travels in sliding engagement with a cam surface of a razor cartridge to an end point of the cam surface while exerting progressively increasing return torque as the razor cartridge rotates about a front pivot axis from a neutral position, and wherein the end point of the cam surface falls proximal to a rear edge of the razor cartridge.

B. The handle according to paragraph A, wherein the proximal end of the spring element comprises an arcuate surface that substantially vertically opposes the abutment surface.

C. The handle according to paragraph B, wherein the arcuate surface is disposed proximate to an inflection point on an arcuate profile of the handle that extends longitudinally along the handle in a sagittal plane.

D. The handle according to paragraph B, wherein the arcuate surface comprises a first curvature that exceeds a second curvature of the distal end proximate to the abutment surface.

E. The handle according to paragraphs A-D, wherein a ratio between the arc length and a width of the distal end of the spring element ranges from about 1.3 to about 12.

F. The handle according to paragraphs A-E, wherein a ratio between the arc length and a height of the spring element ranges from about 0.5 to about 20.

G. The handle according to paragraphs A-F, wherein a ratio between the arc length and a length of the spring element ranges from about 0.5 to about 0.99.

H. The handle according to paragraphs A-G, wherein the spring element deflects by a preload distance to exert a non-zero return torque when the razor cartridge is in the neutral position.

I. The handle according to paragraph H, wherein the preload distance ranges from about 0 to about 1.5 times a height of the spring element.

J. The handle according to paragraphs A-I, wherein a shaving plane of the razor cartridge is unencumbered by the abutment surface during shaving.

K. The handle according to paragraphs A-J, further comprising a pivot structure extending from the head portion that engages with the razor cartridge to define the front pivot axis.

L. The handle according to paragraph K, wherein the pivot structure comprises a plurality of pivot arms that engage with the razor cartridge on laterally opposing sides of the spring element to define the front pivot axis.

M. The handle according to paragraphs K, wherein the pivot structure engages with the razor cartridge at a position that intervenes between a foremost blade of the razor cartridge and the head portion.

N. The handle according to paragraphs A-M, wherein a thickness of the spring element at the distal end ranges from 0.1 millimeter (mm) to 3.0 mm.

O. The handle according to paragraphs A-N, wherein the spring element is a cantilever that lacks support external to an interface between the head portion and the proximal end of the spring element.

P. A razor comprising:
  a) a razor cartridge with a plurality of blades disposed in a housing that includes a front edge associated with a front pivot axis and a rear edge; and b) a handle that includes a head portion and a spring element, wherein the head portion facilitates coupling the razor cartridge in pivotal relation with the handle, wherein the spring element extends integrally from the head portion at a proximal end that longitudinally opposes a distal end of the spring element, and wherein the spring element deflects as an abutment surface on the distal end travels in sliding engagement with a cam surface of the razor cartridge to exert progressively increasing return torque as the razor cartridge rotates about the front pivot axis such that the rear edge approaches the handle.

Q. The razor according to paragraph P, wherein the cam surface of the razor cartridge is convex.

R. The razor according to paragraph P or Q, wherein the spring element deflects by a preload distance to exert a non-zero return torque when the razor cartridge is in a neutral position.

S. The razor according to paragraphs P-R, wherein the proximal end of the spring element comprises an arcuate surface that vertically opposes the abutment surface, and wherein the arcuate surface is disposed proximate to an inflection point on an arcuate profile of the handle that extends longitudinally along the handle in a sagittal plane.

T. A handle for a razor comprising a spring element having a distal end with an abutment surface and a proximal end that longitudinally opposes the distal end, wherein the spring element extends integrally from a head portion of the handle at the proximal end, wherein the proximal end comprises an arcuate surface disposed proximate to an interface between the head portion and the spring element, wherein the arcuate surface substantially vertically opposes the abutment surface, and wherein the abutment surface is substantially planar with respective lower surfaces of a pair of pivot arms that extend from the head portion on laterally opposing sides of the spring element.

U. The handle according to paragraph T, wherein a thickness of the spring element at the distal end ranges from 0.1 mm to 3.0 mm.

V. The handle according to paragraphs T or U, wherein the arcuate surface is disposed proximate to an inflection point on an arcuate profile of the handle that extends longitudinally along the handle in a sagittal plane.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" In some instances, the functionality equivalent range is up to about +/−10 percent of the value.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor comprising:

a handle comprising:

a head portion that facilitates coupling a razor cartridge of the razor in a pivotal relation with respect to the handle; and a spring element having a distal end and a proximal end that longitudinally opposes the distal end to define an arc length of the spring element, wherein the spring element extends integrally from the head portion at the proximal end, the razor cartridge coupled in a pivotal relation to the head portion of the handle, the razor cartridge comprising a housing, at least one blade disposed in the housing, the housing having a front edge and an opposing rear edge, a back surface and an opposing top surface, the back surface having a cam surface extending from the front edge to the rear edge, wherein the spring element deflects as an abutment surface on the distal end travels in a sliding engagement with the cam surface to an end point of the cam surface while exerting a progressively increasing return torque as the razor cartridge rotates about a front pivot axis from a neutral position, and wherein the end point of the cam surface falls proximal to the rear edge of the housing, and wherein the proximal end of the spring element comprises an arcuate surface that substantially vertically opposes the abutment surface and is disposed proximate to an inflection point on an arcuate profile of the handle that extends longitudinally along the handle in a sagittal plane.

2. The razor of claim 1, wherein the arcuate surface comprises a first curvature that exceeds a second curvature of the distal end proximate to the abutment surface.

3. The razor of claim 1, wherein a ratio between the arc length and a width of the distal end of the spring element ranges from about 1.3 to about 12.

4. The razor of claim 1, wherein a ratio between the arc length and a height of the spring element ranges from about 0.5 to about 20.

5. The razor of claim 1, wherein the spring element deflects by a preload distance to exert a non-zero return torque when the razor cartridge is in the neutral position.

6. The razor of claim 5, wherein the preload distance ranges from about 0 to about 1.5 times a height of the spring element.

7. The razor of claim 1, wherein a shaving plane of the razor cartridge is unencumbered by the abutment surface during shaving.

8. The razor of claim 1, further comprising:

a pivot structure extending from the head portion that engages with the razor cartridge to define the front pivot axis.

9. The razor of claim 8, wherein the pivot structure comprises a plurality of pivot arms that engage with the razor cartridge on laterally opposing sides of the spring element to define the front pivot axis.

10. The razor of claim 8, wherein the pivot structure engages with the razor cartridge at a position that intervenes between a foremost blade of the razor cartridge and the head portion.

11. The razor of claim 1, wherein a thickness of the spring element at the distal end ranges from 0.1 millimeter (mm) to 3.0 mm.

12. The razor of claim 1, wherein the spring element is a cantilever that lacks support external to an interface between the head portion and the proximal end of the spring element.

* * * * *